May 20, 1924.

G. SCHROEDER 1,494,715

COOLING OF ELECTRICAL APPARATUS

Filed March 11, 1921  2 Sheets-Sheet 1

INVENTOR

May 20, 1924.

G. SCHROEDER 1,494,715

COOLING OF ELECTRICAL APPARATUS

Filed March 11, 1921    2 Sheets-Sheet 2

INVENTOR
Giulio Schroeder,

Patented May 20, 1924.                                                              1,494,715

UNITED STATES PATENT OFFICE.

GIULIO SCHROEDER, OF HALE, ENGLAND.

COOLING OF ELECTRICAL APPARATUS.

Application filed March 11, 1921. Serial No. 451,627.

*To all whom it may concern:*

Be it known that I, GIULIO SCHROEDER, a subject of the King of Italy, residing in Hale, Cheshire, England, have invented certain new and useful Improvements in the Cooling of Electrical Apparatus, of which the following is a specification.

This invention relates to the cooling of electric apparatus by removing heat from cores which are the seat of fluxes which undergo relatively rapid changes either in quantity or position. It deals particularly with alternating current dynamo-electric machines.

In the method of working dealt with in this invention, cooling is effected by means of liquid flowing through ducts in the core which are disposed across the path of movement of the lines of flux.

This movement of the flux will accordingly tend to produce a difference of electric potential between the two ends of a duct and between the differently placed ducts in the core. It is therefore of importance in the practical application of this method of cooling to provide that the possibility of this potential difference becoming effective in producing current in the duct system shall be reduced to a minimum. On the other hand it is frequently advantageous to employ metal tubes for conveying the liquid into and through the ducts, and this invention has for its object to provide for the use of a metallic system for the circulation of the cooling fluid while avoiding the production of large electric currents in this system. This is effected by disposing and interconnecting the tubes which form the cooling system in such a way that the sum of the electro-motive forces generated by the flux cutting the tubes is approximately zero in any complete circuit formed by these tubes.

In order to recognize how this result is attained, the tubes in the core may be considered as elements of an electric winding which are to be grouped together in series or in series parallel so that the total electro-motive force around a closed circuit is always zero or approximately zero.

Figure 1:
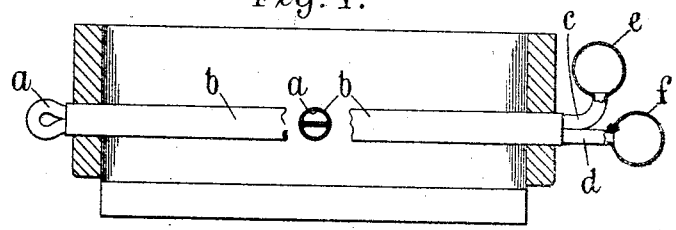
Figure 2:
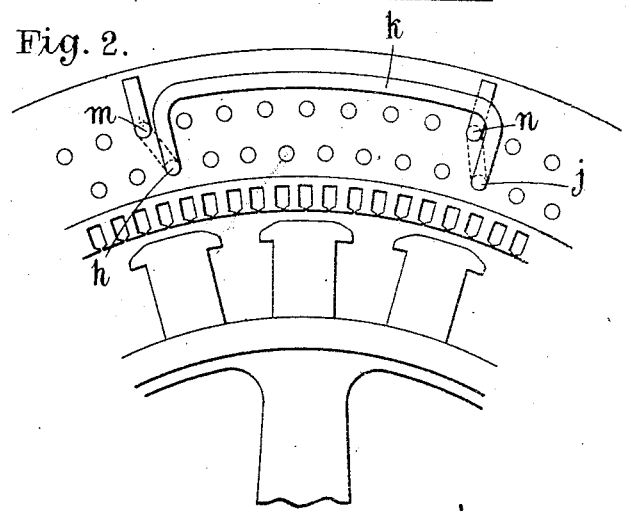
Figure 3:
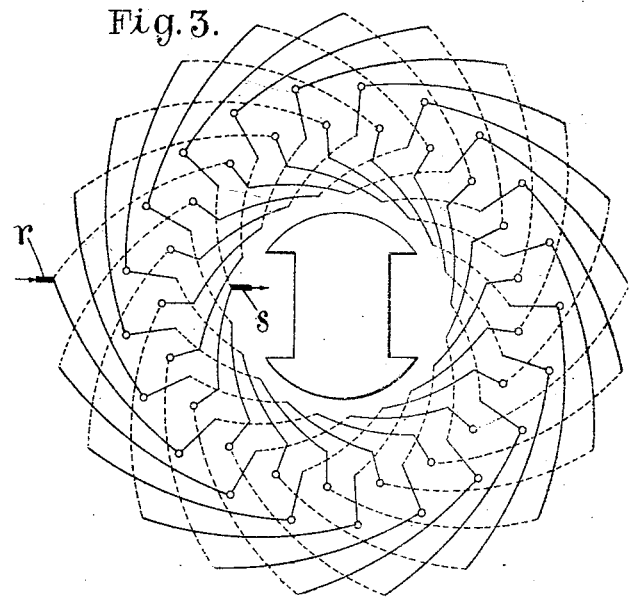

The method of carrying the invention into effect will be described by way of the accompanying diagrammatic drawings. In these, Figure 1 is a longitudinal section through part of the core of the stator of an electric machine showing one form of cooling element inserted in the core. Figure 2 is a side elevation of part of an electric machine, for instance, an alternator showing a second form of cooling arrangement applied to the stator core. Figure 3 is a diagram and Figure 4 an end elevation, and Figure 5 a part section of the stator of a turbo-alternator to which a third form of cooling arrangement is applied.

A way of producing a non-inductive arrangement of cooling tubes of the kind indicated is to employ as the element of the circulating system a pair of tubes, one of which is used for the outward flow and the other for the return, these two tubes being located in the core in such positions that practically the same flux or equal fluxes cut through both tubes of a pair in the same way at the same time. This pairing of the tubes may be brought about in one arrangement by placing the two members of a pair close together preferably within the same longitudinal duct in the core as indicated in Figure 1. In such an arrangement, the pair of tubes may be united to form a single member with a longitudinal division, one half of which is used for the outward flow and the other for the return or as in the arrangement illustrated two tubes may be inserted side by side being shaped so as to fit within the duct. In the example illustrated the duct is circular and a thin-walled tube *a* of approximately semi-circular section is used. This tube is bent on itself so that the flat sides lie together and the combined shape is approximately circular as shown in the inset section in Figure 1. This folded tube is then inserted in the duct, a thin layer of insulation being interposed as indicated at *b*. The free ends *c* and *d* of the folded tube are then bent appropriately and connected with the chambers *e* and *f* forming the inlet and outlet connections respectively. With such an arrangement a pair of chambers as *e* and *f* may be provided at each end of the core and between each pair of chambers, the liquid will pass along a series of ducts through the core and back again to the same end. If the number and arrangements of the ducts require it more than one pair of chambers can be arranged at each end of the core.

Another pairing arrangement applicable to the case where the machine has more than one pair of poles, is obtained by utilizing as members of a pair of tubes those located in ducts in the core which are separated by two pole pitches. Such an arrangement is illustrated in Figure 2 in which tubes $h$ and $j$ have a connection $k$ joining them in series.

It will be seen that the resultant electromotive force produced by the action of the flux on $h$ and $j$ will always be zero so that the ends of $h$ and $j$ at the opposite end of the core to that at which the connection $k$ is located could be connected together or to earthed metal without producing a circulating electric current. It will also be seen that the effect is not altered by connecting $h$ and $j$ to another pair of tubes $m$ and $n$ also separated by two pole pitches.

A number of groups such as that indicated in Figure 2 may be provided until all of the cooling ducts have been filled. These groups can either be connected in parallel or in series for the flow of liquid through them and connection can be made to the parts of the circulating system external to the machine.

Figure 4:
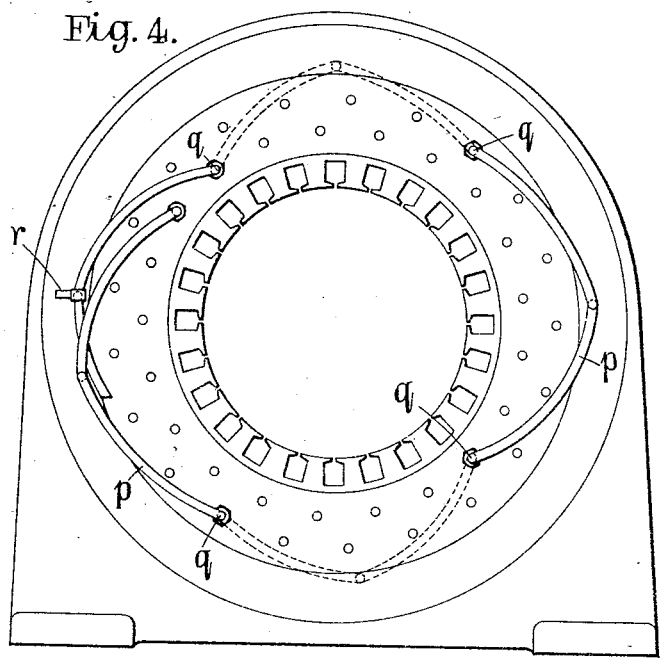
Figure 5:
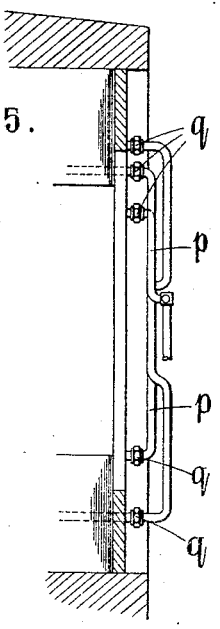

It will be recognized that an arrangement as illustrated in Figure 2 when extended to the whole of the machine, gives a tube system disposed in a manner analogous to a winding for half the number of poles for which the machine is constructed. Another system is illustrated in Figures 3, 4 and 5 in which the arrangement resembles a fractional pitch closed wave winding for four poles. This is intended to be applied to the stator of a two pole turbo-alternator, the field core being indicated in the centre of the diagram forming Figure 3.

It will be understood that in this diagram the black circles indicate the positions of the tubes which are disposed in ducts lying in two concentric circles as indicated in Figure 4 so as to permit the end connections $p$ to be formed and located in relation to each other like the corresponding parts of a two-layer winding with the exception that the corresponding tubes of the respective layers are not in the same radial planes but are in planes angularly displaced relative to each other to a small extent, thus providing somewhat more freedom for the insertion and connecting up of the end pieces $p$ which may be joined to the longitudinal tubes by means of screwed unions as indicated by $q$.

It will be understood by analogy with a winding diagram that the connections at one end of the core are indicated in Figure 3 by the outer set of curved lines, while connections at the other end are indicated by the inner set of curved lines. Accordingly, the inflow connection $r$ and the outflow connection $s$ will be at opposite ends of the core. It will be understood that while Figure 3 shows the complete arrangement, Figures 4 and 5 only show part of the system of tubes.

It will be recognized by analogy that any system of tubes and end connections which may be represented diagrammatically as a closed mesh winding will be free from circulating currents within the mesh. In certain cases, however, dependent upon the relation of the pitch of the winding to the pole pitch of the machine it will not be possible to find two points on the system of tubes that can be connected together or earthed without current flowing through the system and these connections. These cases will be readily distinguished by persons acquainted with the properties of closed mesh windings and it will be understood that they will necessitate the use of insulating couplings in all of the inlet and outlet tubes or in all but one of them.

In the example illustrated in Figure 3, it will be seen that the resultant electromotive force between the connections $r$ and $s$ can in general have only a relatively small value so that in view of the high impedance of the system of tubes, it may be unnecessary to insulate either of these pipes $r$ and $s$.

In order to minimize the effects of local eddy currents in the material of the tubes in the core, it is preferable to use a high resistance metal or alloy for the tubes and to make the walls as thin as structural and manufacturing conditions permit.

In order to secure a good heat conductivity between the core and the tubes, the latter should be made a good fit in the core, but should have a thin layer of insulating material between them and the core, sufficient to withstand the comparatively small voltage that will be generated in a single tube.

A method of securing a good fit of the tubes in the ducts is one in which the tubes are made with a slight clearance in the ducts and after being placed in position are expanded by hydraulic or pneumatic pressure.

What I claim as my invention and desire to secure by Letters Patent is:—

1. In a wound core of a dynamo electric machine having a set of longitudinal ducts spaced radially away from the part occupied by the winding, a cooling arrangement comprising a circulating system for cooling liquid consisting of longitudinal tubular parts inserted in the said ducts in the core and insulated from the core and interconnecting parts beyond the ends of the longitudinal parts, the interconnection being carried out so as to produce such a grouping of the longitudinal parts that the sum of the electro-motive forces generated in them by the operative flux of the machine cutting them is approximately zero in any complete circuit formed by the system.

2. In a wound core of a dynamo electric machine having a set of longitudinal ducts spaced radially away from the part occupied by the winding, a cooling arrangement comprising a circulating system for cooling liquid consisting of longitudinal tubular parts inserted in ducts in the core and insulated from the core, and interconnecting tubular parts between the ends of the longitudinal parts, the said longitudinal and end parts forming a continuous system similar to a closed mesh winding.

3. In a wound core of a dynamo electric machine having a set of longitudinal ducts spaced radially away from the part occupied by the winding, a cooling arrangement comprising a circulating system for cooling liquid consisting of longitudinal tubular parts inserted in ducts in the core and insulated from the core, and interconnecting tubular parts between the ends of the longitudinal parts, the said longitudinal and end parts forming a continuous system similar to a closed mesh winding of a pitch different from the pole pitch of the operative flux of the machine and such that the sum of the electro-motive forces generated in the continuous system by the operative flux of the machine is approximately zero around the system.

4. In a wound core of a dynamo electric machine having a set of longitudinal ducts spaced radially away from the part occupied by the winding, a cooling arrangement comprising a circulating system for cooling liquid consisting of longitudinal tubular parts inserted in ducts in the core and insulated from the core, interconnecting tubular parts between the ends of the longitudinal parts, the said longitudinal and end parts forming a continuous system similar to a closed mesh winding of a pitch equal to approximately half the pole pitch of the operative flux of the machine.

In testimony whereof I affix my signature.

GIULIO SCHROEDER.